(12) United States Patent
Carter

(10) Patent No.: US 10,480,584 B2
(45) Date of Patent: Nov. 19, 2019

(54) COMPACT PLASTIC OLDHAM COUPLER

(71) Applicant: LEXMARK INTERNATIONAL, INC., Lexington, KY (US)

(72) Inventor: Daniel Lee Carter, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 479 days.

(21) Appl. No.: 15/472,713

(22) Filed: Mar. 29, 2017

(65) Prior Publication Data

US 2018/0283459 A1    Oct. 4, 2018

(51) Int. Cl.
*F16D 3/04* (2006.01)
*G03G 21/16* (2006.01)
*G03G 15/00* (2006.01)

(52) U.S. Cl.
CPC ............. *F16D 3/04* (2013.01); *G03G 15/757* (2013.01); *G03G 21/1647* (2013.01); *G03G 2221/1657* (2013.01); *Y10T 464/20* (2015.01)

(58) Field of Classification Search
CPC .......... F01C 17/066; F16D 3/04; F16D 66/02; G06G 15/757; G06G 21/1647; G06G 2221/1657; Y10T 464/20
USPC ............................ 464/23, 102–105; 399/167
See application file for complete search history.

(56) References Cited

U.S. PATENT DOCUMENTS

| | | | | |
|---|---|---|---|---|
| 8,064,800 B2* | 11/2011 | Carter | .................. | F16D 1/0858 399/167 |
| 8,257,185 B2* | 9/2012 | Carter | .................. | G03G 15/80 464/105 |
| 2008/0138113 A1* | 6/2008 | Murrell | ................ | G03G 15/757 399/167 |
| 2016/0305485 A1 | 10/2016 | Carter | | |

* cited by examiner

*Primary Examiner* — Josh Skroupa

(57) ABSTRACT

An Oldham coupler assembly for transferring rotary power between two shafts in an imaging device. The Oldham coupler includes an input plate, an output plate, and a drive plate and two pairs of coupling wheels, and, in one embodiment, made of the same plastic material. The drive plate has a pair of open-ended slots along one axis and a close-ended center slot along a second axis orthogonal to the first axis. The drive plate is mechanically coupled and positioned in between the input plate and the output plate. A plastic retraction spline assembly is slidably retained in the output plate and engages with a drive member in an imaging unit. The input plate includes gear teeth integrally molded into the outer circumference thereof decreasing the overall width of the Oldham coupler. The two pairs of coupling wheels have the same diameter.

27 Claims, 12 Drawing Sheets

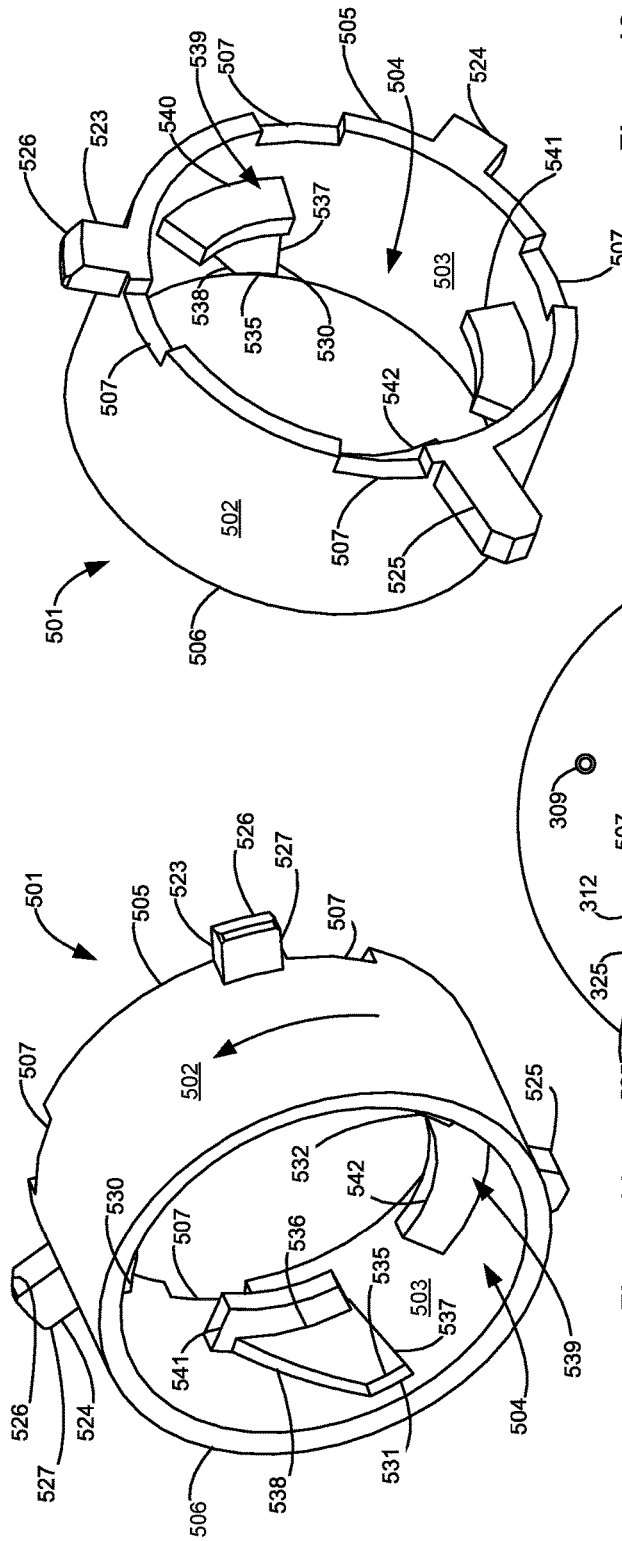
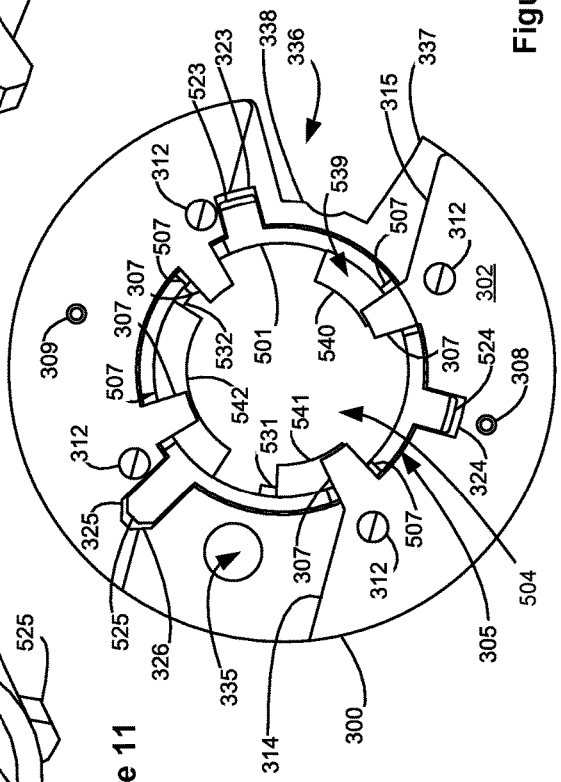
Figure 12
Figure 13
Figure 11

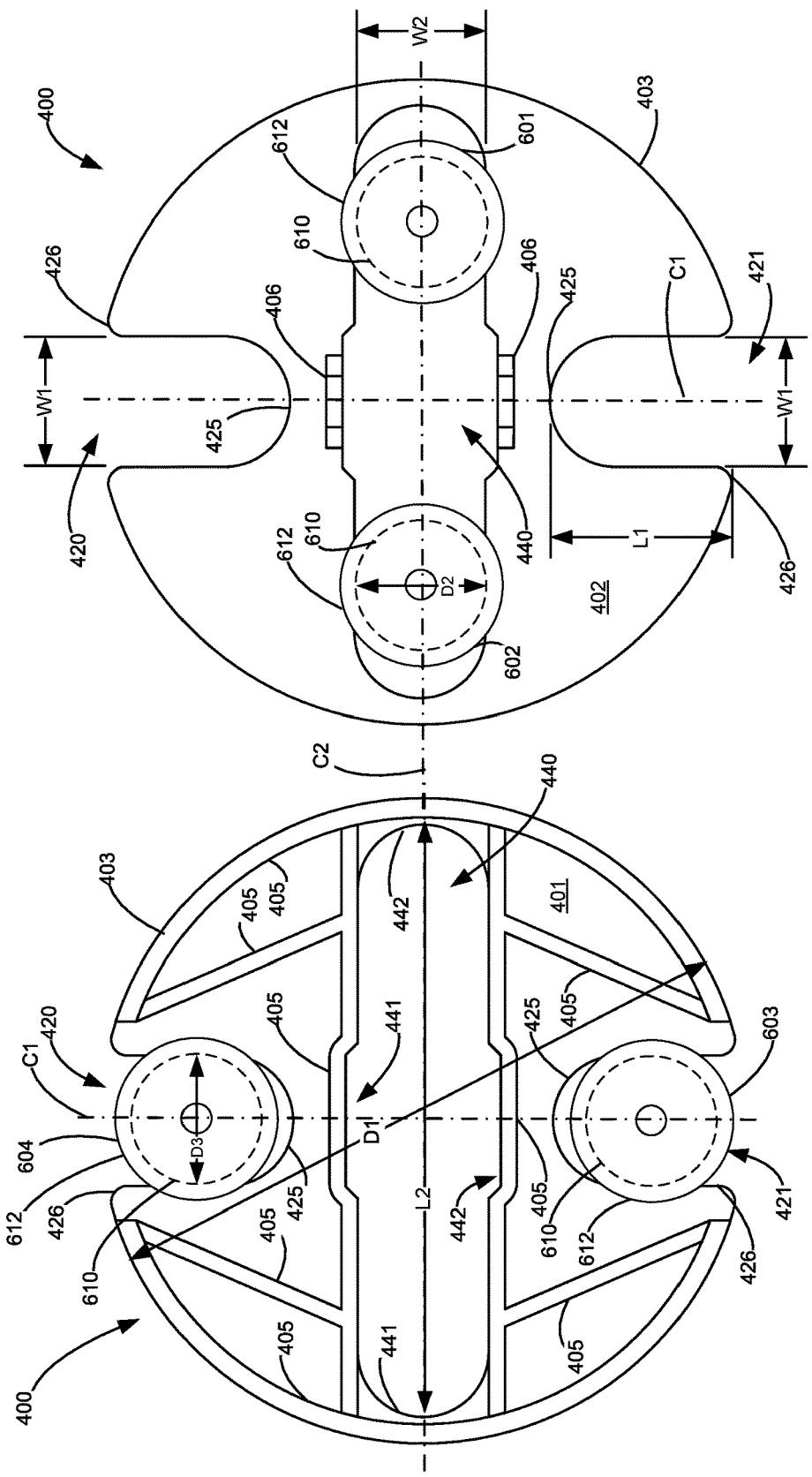

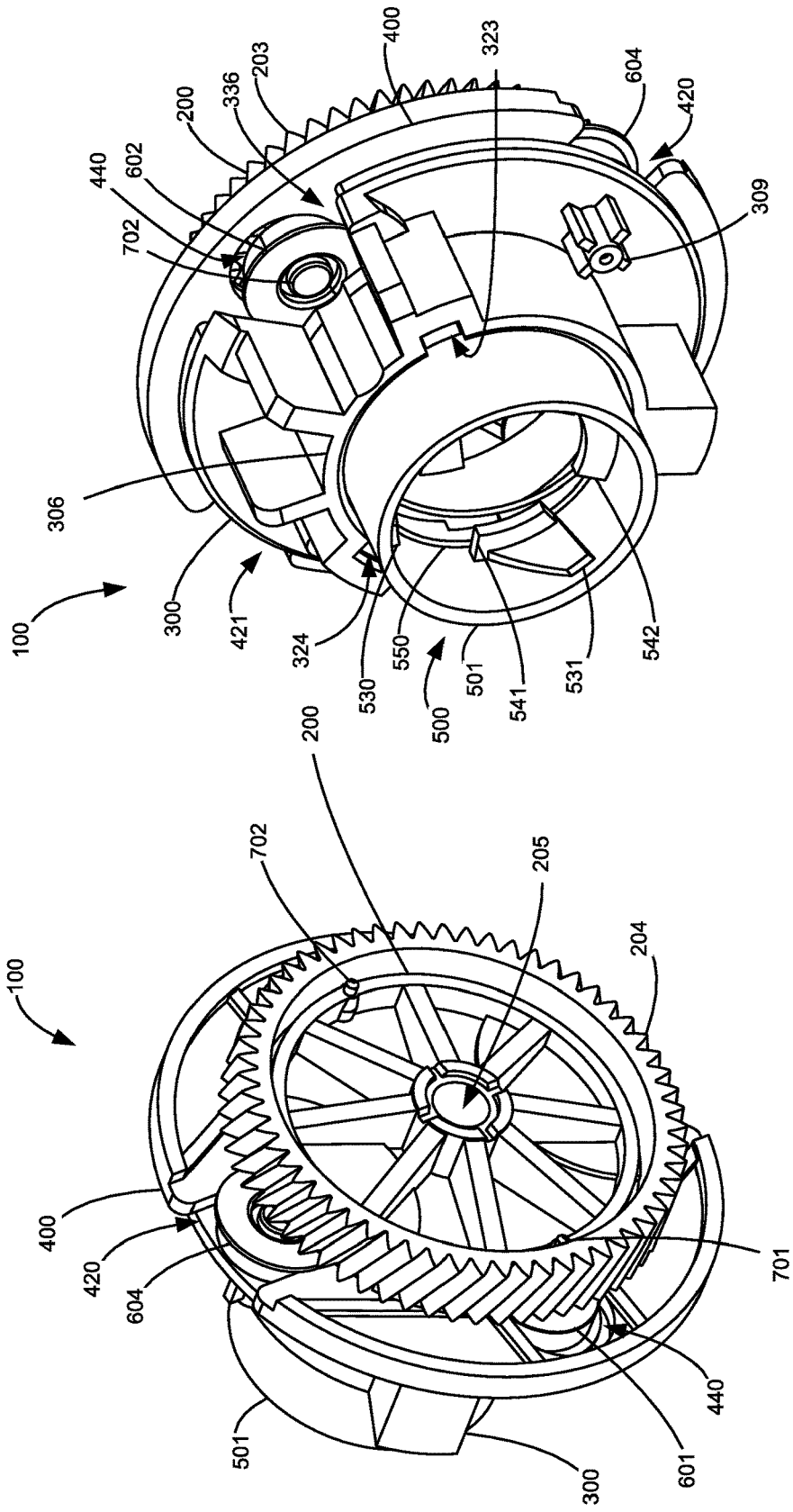

COMPACT PLASTIC OLDHAM COUPLER

CROSS REFERENCES TO RELATED APPLICATION

The present disclosure is related to U.S. patent application Ser. No. 14/686,140 entitled "Compact Metal and Plastic Oldham Coupler with an Integral Gear on an Input Plate and a Retraction Spline on an Output Plate", filed Apr. 14, 2015 and assigned to the assignee of the present disclosure.

BACKGROUND

Field of the Invention

The present invention relates generally to image formation devices, and in particular to a coupling mechanism between an imaging unit and its drive source in a color electrophotographic printer; specifically, an Oldham coupler for transferring rotary power between two parallel non-collinear aligned shafts.

Description of the Related Art

Oldham couplers have been employed for decades in drive systems of diverse machines for transferring torque or rotary power between two parallel but non-collinear and/or non-radially aligned rotating shafts. In the past, Oldham couplers have been used to couple two shafts together. Further retraction splines have been provided on Oldham couplers, and such retraction splines traveled through the center of the gearing which limited their size and torsional stiffness.

Monochromatic or color electrophotographic printers appear to be sensitive to low frequency oscillations of the drive system. As the star plate or drive plate in the Oldham coupler oscillates when driving the imaging units of the printer, banding may occur on the printed media sheet with band heights in the range of 0.5 mm to 2 mm. By using a stiffer drive system, the natural frequency of the drive system will increase and shorten the wavelength of the banding to the point that it is not visible on the page to the naked eye. In the past Oldham couplers with retraction splines made of all plastic experienced this problem. A combination of metal input and output plates with a plastic drive plate has been used to improve the torsional stiffness of the Oldham coupler while reducing the amount of banding on the media sheet. However, such combination Oldham couplers are relatively expensive.

The drive plate of the Oldham coupler is typically made of metal and the two pairs of wheels that engaged in the two pairs of drive plate slots are made of a plastic. Because the drive plate and the wheels are made of dissimilar materials the wheels tend to slide in the slots rather than rotate leading to increased wheel wear. Due to size constraints one pair of slots is usually narrower than the other resulting in one pair of wheels having a smaller diameter than the other pair. The smaller diameter wheels tend to wear more quickly than the larger diameter wheels. The room needed for the stud or screw attachment of the wheels used in the prior art Oldham coupler adds to the overall width of the Oldham coupler. This also leads to a smaller wheel to axle ratio and a higher side load generated by the Oldham coupler.

It would be advantageous to have an Oldham coupler where the input, output and drive plates are made of plastic and at a lower cost than current combination Oldham couplers. It would be further advantageous to have an Oldham coupler where the drive plate and connecting wheel are made of similar materials. It would be further advantageous to have the drive plate slots have the same width and the two pairs of connecting wheels to have a diameter that is substantially the same as the slot width.

SUMMARY OF THE INVENTION

According to an exemplary embodiment of the present invention, there is provided an Oldham coupler assembly for transferring rotary power between two shafts in an imaging unit of an imaging device. The Oldham coupler includes an input plate and an output plate made of a first material, a drive plate made of a second material positioned in between and slidably coupled to the input plate and the output plate and a spline assembly slidably attached to the output plate. The input plate has gear teeth extending around the outer circumference thereof. The drive plate has a close-ended center slot and a pair of open-ended channels positioned orthogonally to the center slot. The slots have substantially the same width. One pair of wheels rides in the center slot and couples the drive plate to the input plate while a second pair of wheels rides in the open-ended slots and couples the drive plate to the output plate. The width of the slots and the diameters of the wheels are substantially the same. The wheels are made of the second material. The output plate has a collar in which the spline assembly is slidably moveable in an axial direction and is biased to axially extend away from the output plate. The spline assembly consists of a sleeve including a plurality of radially extending exterior retention lugs and a plurality of interior drive lugs spaced about the circumference of the outer and inner walls of the sleeve. The retention lugs are slidably received through corresponding channels axially extending along the inner surface of the collar. The drive lugs are engageable with corresponding drive dogs of a drive member in an imaging unit. The first material and second material may be a plastic.

BRIEF DESCRIPTION OF THE DRAWINGS

The above-mentioned and other features and advantages of the various embodiments of the invention, and the manner of attaining them, will become more apparent and will be better understood by reference to the accompanying drawings.

FIG. 7 is a perspective view of the outer surface of the input plate and FIG. 8 is a perspective view of the inner surface of the input plate.

FIG. 9 is a perspective view of the outer surface of the output plate and FIG. 10 is a perspective view of the inner surface of the output plate.

FIGS. 11-12 illustrate the spline sleeve insertable into the output plate of FIGS. 9-10 where FIG. 11 is a perspective view of the outer side of the spline sleeve and FIG. 12 is a perspective view of the inner side of the spline sleeve.

FIG. 13 illustrates the spline sleeve of FIGS. 11-12 inserted into the output plate of FIGS. 9-10.

FIGS. 14-15 illustrate the drive or drive plate of the Oldham coupler assembly where FIG. 14 is the inner face of the drive plate and FIG. 15 is the outer face of the drive plate.

FIGS. 16-17 illustrate an assembled Oldham coupler assembly where FIG. 16 is a perspective view from the input plate side and FIG. 17 is a perspective view from the output plate side.

DETAILED DESCRIPTION

Figure 1:
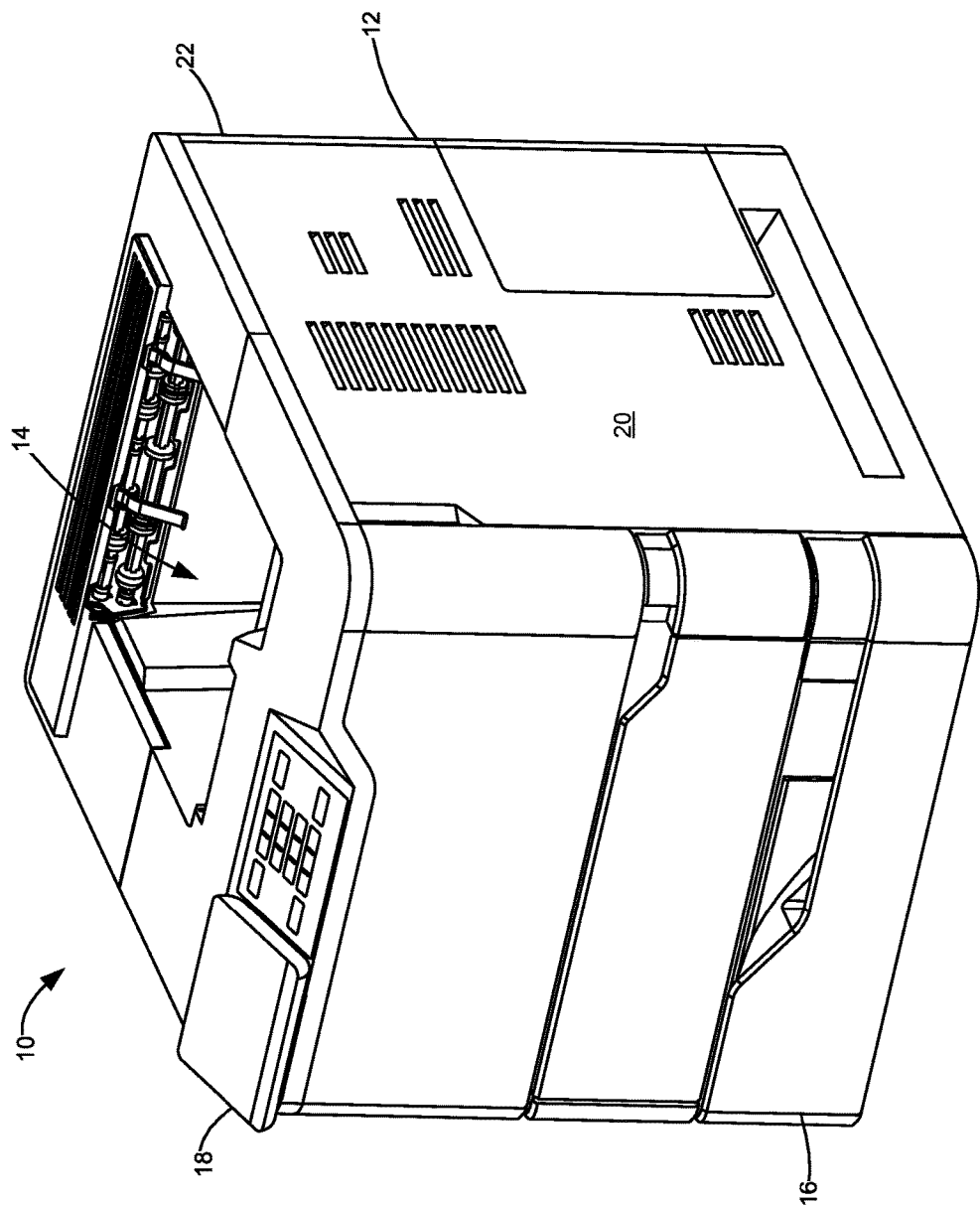
FIG. 1 is a representative imaging device.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise. The use of "including," "comprising," or "having" and variations thereof herein is meant to encompass the items listed thereafter and equivalents thereof as well as additional items.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear" and "side" "under", "below", "lower", "over", "upper", and the like, are used for ease of description to explain the positioning of one element relative to a second element as viewed in the accompanying figures. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

Terms such as "about" and the like have a contextual meaning, are used to describe various characteristics of an object, and have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Reference will now be made in detail to the exemplary embodiment(s) of the present disclosure as illustrated in the accompanying drawings. Whenever possible, the same reference numerals will be used throughout the drawings to refer to the same or like parts. Furthermore, and as described in subsequent paragraphs, the specific mechanical configurations illustrated in the drawings are intended to exemplify embodiments of the present disclosure and that other alternative mechanical configurations are possible.

Figure 2:
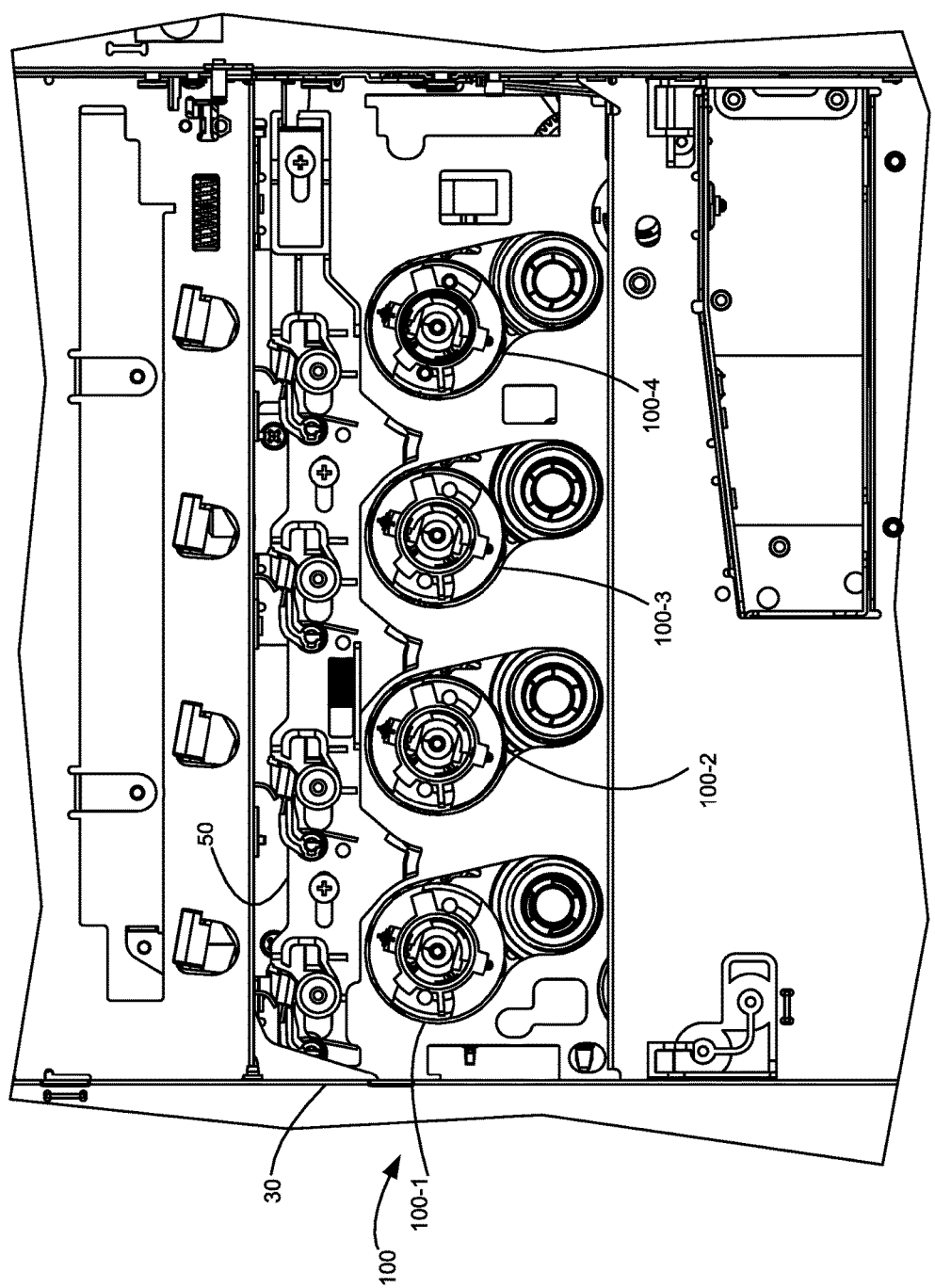
FIG. 2 is an internal view of the imaging device of FIG. 1 showing a plurality of drive assemblies each having an Oldham coupler assembly according to one embodiment of the present invention.
Figure 3:
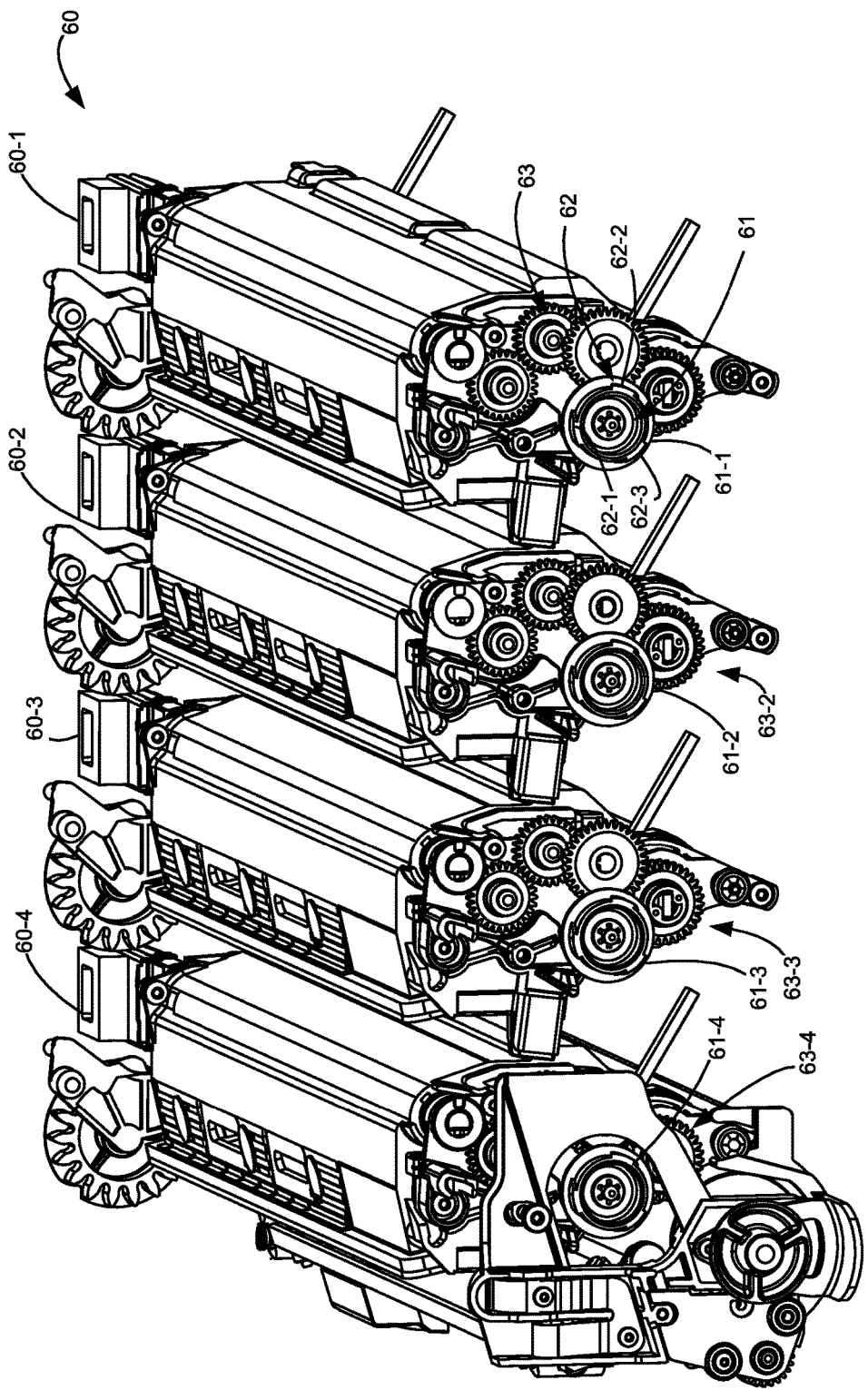
FIG. 3 is a perspective view of four imaging units that are insertable into the imaging device of FIG. 2 and which will engage with a respective one of the Oldham coupler assemblies shown in FIG. 2.

FIG. 1 depicts a color imaging device 10 including a housing 12 with a media output area 14 on top, a removable media input tray 16, a user interface 18 and a side panel 20 that opens by pivoting about a rear edge 22 to expose the interior of imaging device 10. FIG. 2 illustrates imaging device 10 with side panel 20 and imaging units removed to expose a drive system 50 mounted to a frame 30 internal to imaging device 10. Drive system 50 includes one or more Oldham couplers of the present disclosure, generally designated 100. Four Oldham coupler assemblies 100-1, 100-2, 100-3, 100-4 are shown. FIG. 3 illustrates the imaging units, generally designated 60, removed from imaging device 10. Four imaging units 60-1, 60-2, 60-3,-60-4 are shown. The four imaging units 60-1-60-4 may each contain a different color of toner such as yellow, cyan, magenta, and black, respectively. Should imaging device 10 be monochromatic, typically, only a black imaging unit would be used.

As is known, each imaging unit 60 includes a photoconductive drum for transferring a toned image to a media sheet along with various toner metering and transfer rolls and a developer roll for supplying toner to the photoconductive drum. Typically, the developer roll is driven by drive system 50. A drive member, generally designated 61 and attached to the housing of each imaging unit 60, drives various components within respective imaging units 60 via a gear train, generally designated 63. Four drive members 61-1, 61-2, 61-3, 61-4 are shown and interface with respective gear trains 63-1, 63-2, 63-3, 63-4 and with respective Oldham coupler assemblies 100-1, 100-2, 100-3, 100-4 to receive torque from drive system 50. Each drive member 61 has one or more drive dogs, generally designated 62, that engage with corresponding drive lugs provided in each of the Oldham coupler assemblies 100-1-100-4. As shown, each of drive members 61-1-61-4 has three drive dogs 62-1, 62-2, 62-3 spaced about the outer circumference. Because each drive member 61 is substantially the same only drive member 61-1 has its drive dogs labeled.

Figure 4:
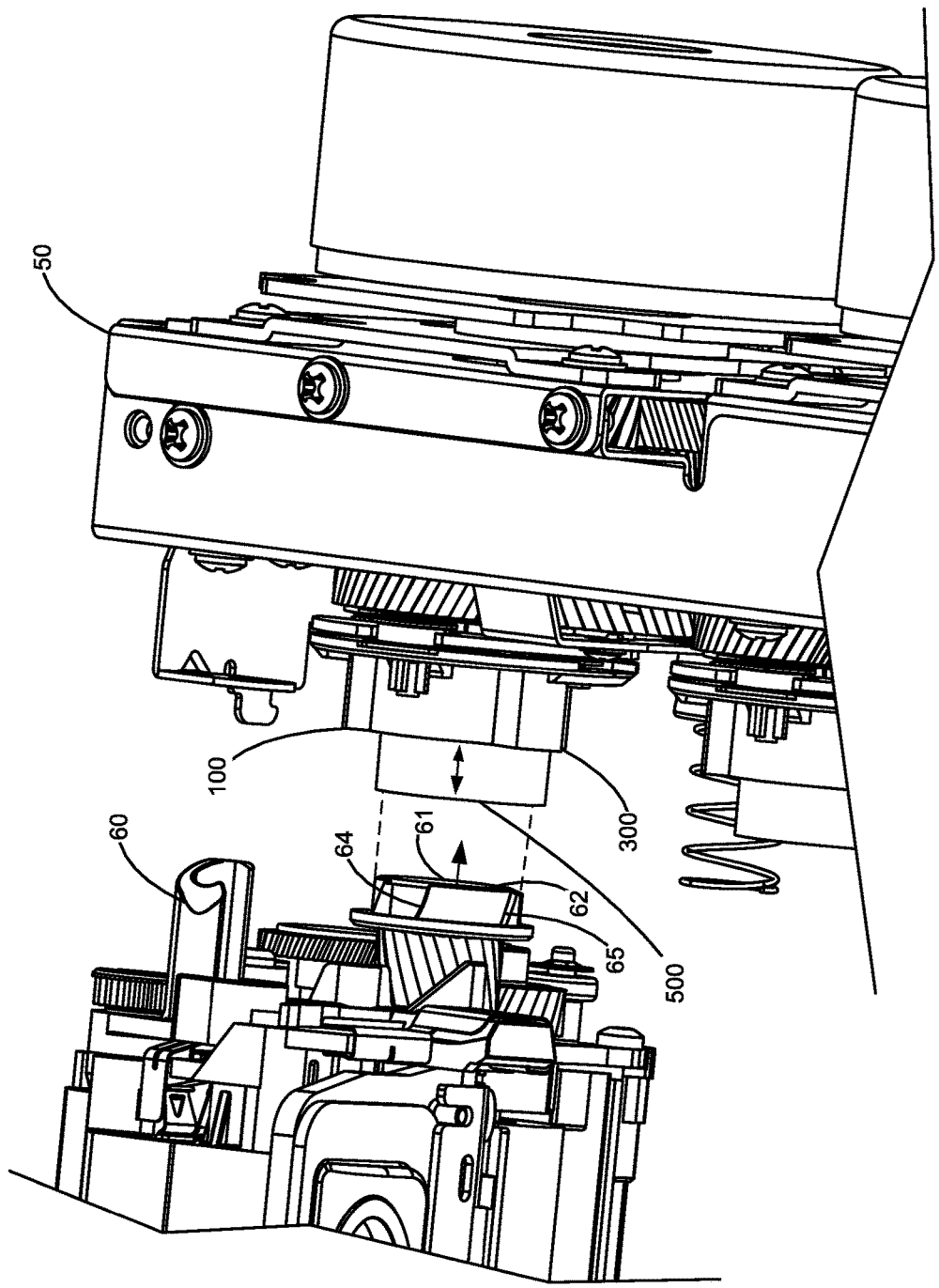
FIG. 4 is a partial sectional perspective view of an imaging unit being inserted into its corresponding Oldham coupler assembly on a drive mechanism.

To engage with drive system 50 each imaging unit 60 is inserted into frame 30 of imaging device 10 until its drive member 61 seats against the Oldham coupler assembly 100 and the drive dogs 62 engage with corresponding ones of drive lugs 530-532 (see FIGS. 11-13) of the Oldham coupler assembly 100. FIG. 4 shows imaging unit 60 approaching drive system 50. Drive member 61 is about to enter, as indicated by the arrow and the two dashed lines, a spline assembly 500 provided on the output plate 300 of Oldham coupler assembly 100. Spline assembly 500 partially retracts into output plate 300 as imaging unit 60 reaches its final inserted position within imaging device 10. Spline assembly 500 houses the drive lugs 530-532 that will engage with drive dogs 62.

Figure 5:
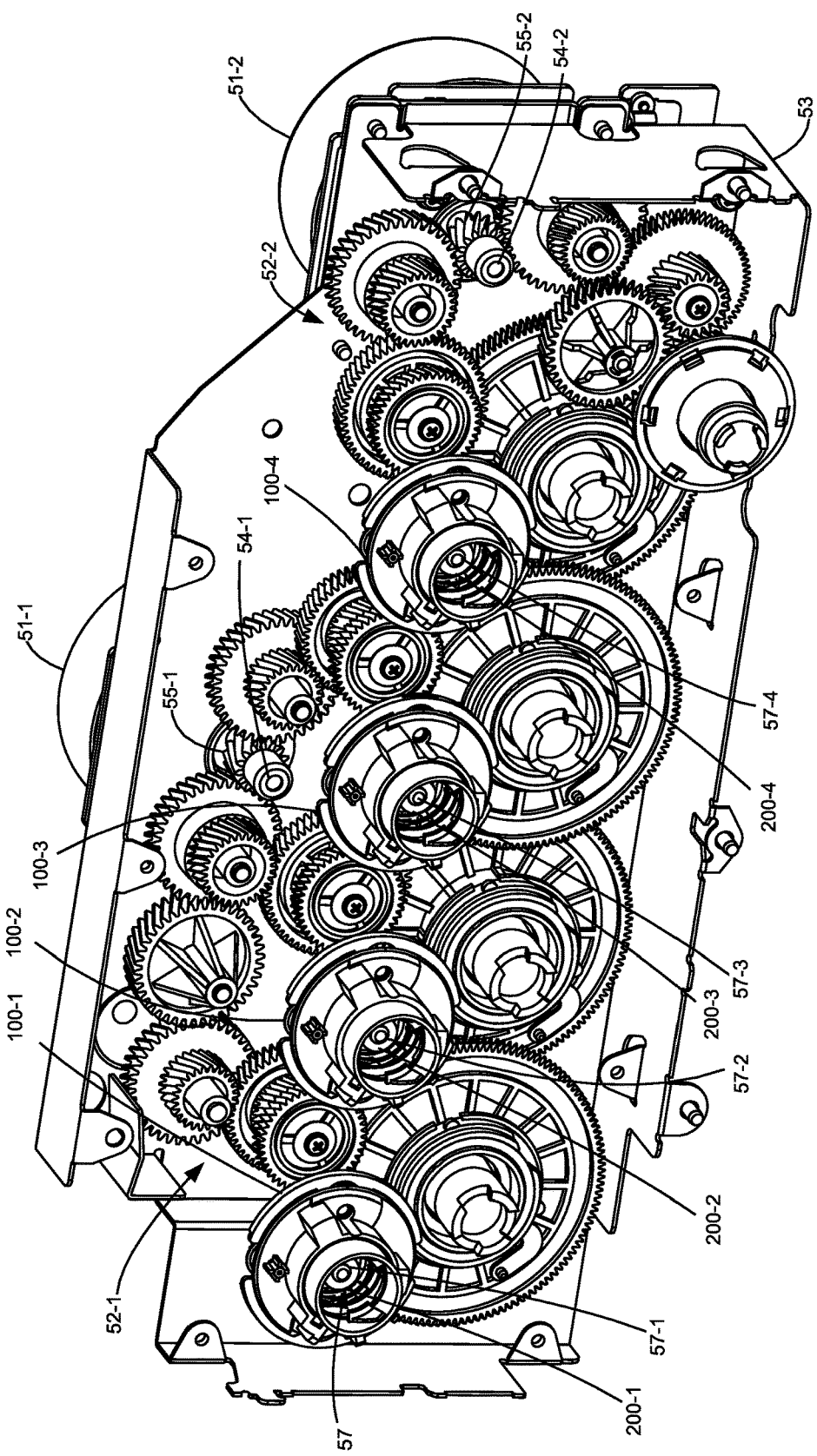
FIG. 5 is a perspective view of the drive mechanism having four Oldham coupler assemblies.

FIG. 5 illustrates the details of drive system 50. Four Oldham coupler assemblies 100-1, 100-2, 100-3, 100-4 are shown. Two motors 51-1, 51-2 and respective gear trains 52-1, 52-2 are shown mounted to a frame 53 for drive system 50. Pinion gears 55-1, 55-1 are mounted on output shafts 54-1, 54-2 of motors 51-1, 51-2, respectively. Gear train 52-1 couples motor 51-1 via pinion gear 55-1 to Oldham coupler assemblies 100-1-100-3 while gear train 52-2 couples motor 51-2 via pinion gear 55-2 to Oldham coupler assembly 100-4. With this arrangement, motor 51-1 would typically drive imaging units 60-1-60-3, the color imaging units of yellow, cyan, and magenta, while motor 51-2 would drive imaging unit 60-4, the black imaging unit. One, two, three or four motors may be used to drive Oldham coupler assemblies 100-1-100-4 and the number of motors used is a matter of design choice. The Oldham coupler assemblies 100 are mounted on a stud, generally designated 57, mounted to frame 53. As shown, the input plates 200-1, 200-2, 200-3, 200-4, as described with reference to FIGS. 6-8, of Oldham coupler assemblies 100-1-100-4 are rotatably mounted on studs 57-1-57-4.

Figure 6:
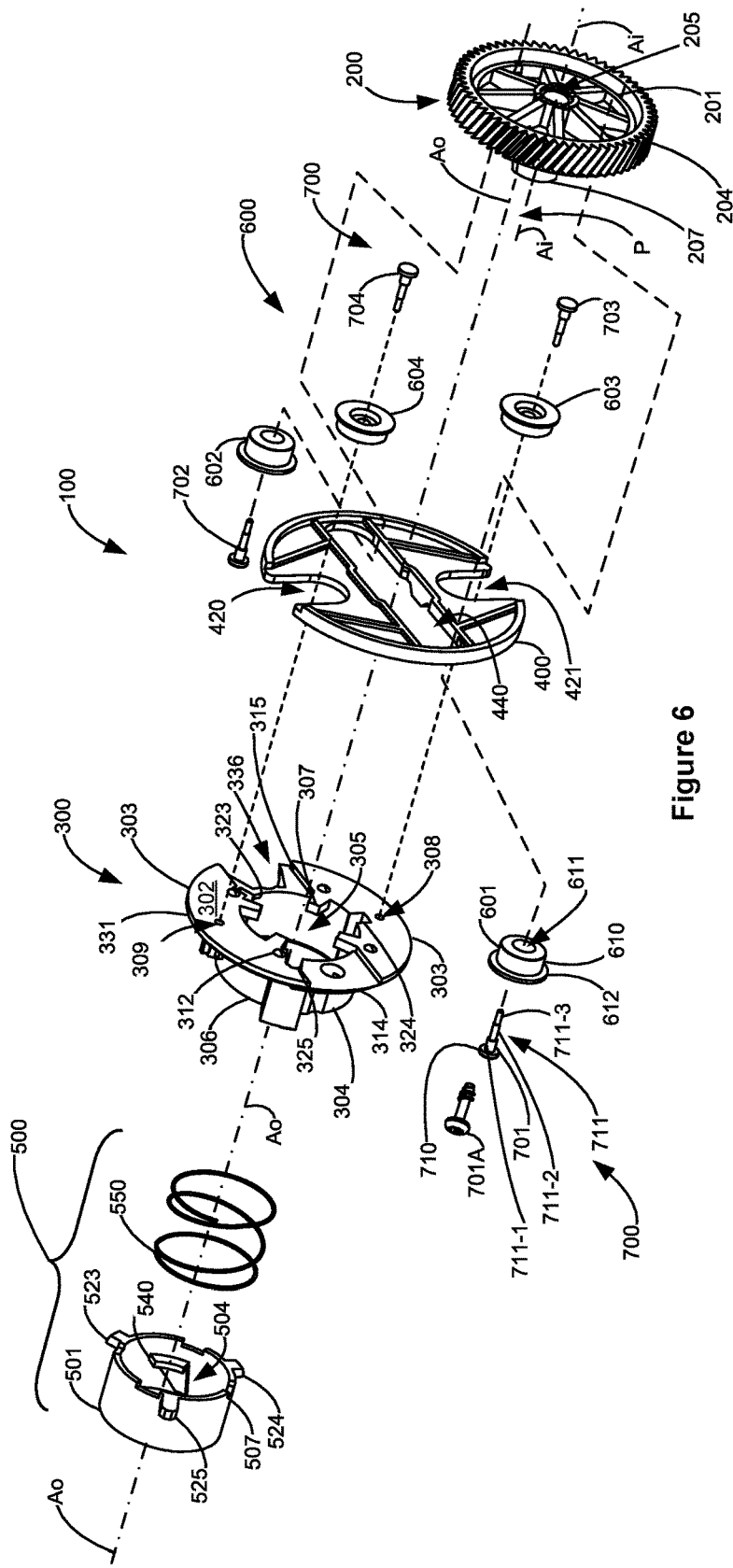
FIG. 6 is an exploded view of the Oldham coupler assembly of FIG. 2 with a plastic input plate having an integral gear, a plastic drive plate, and a plastic output plate having a retractable spline assembly.

Details and features of the presently disclosed Oldham coupler assembly will now be described with respect to FIGS. 6-17. FIG. 6 illustrates an exploded view of Oldham coupler assembly 100 comprising an input plate 200, an output plate 300, a drive plate 400 having opposed open-ended slots 420, 421 orthogonally positioned to closed-end center slot 440, a spline assembly 500 consisting of sleeve 501 and spring 550, wheels 600 illustrated as wheels 601-604 and fasteners 700 illustrated as fasteners 701-704. Drive plate 400 corresponds to the star plate found in prior art Oldham couplers. The term "drive plate" has been used rather than the term "star plate" in that drive plate 400 no longer resembles the prior art design star plates that were used to drive the output plate and that had two orthogonal slot pairs formed of opposed open-ended slots causing the plate to resemble a star. Input plate 200 is shown having an axis of rotation designated Ai and output plate 300 is shown as having an axis of rotation designated Ao. At location P, the two axes are shown as being slightly offset as Oldham coupler assembly 100 is designed to connect two parallel shafts that may be, but not necessarily are, offset.

Figures 7, 8:
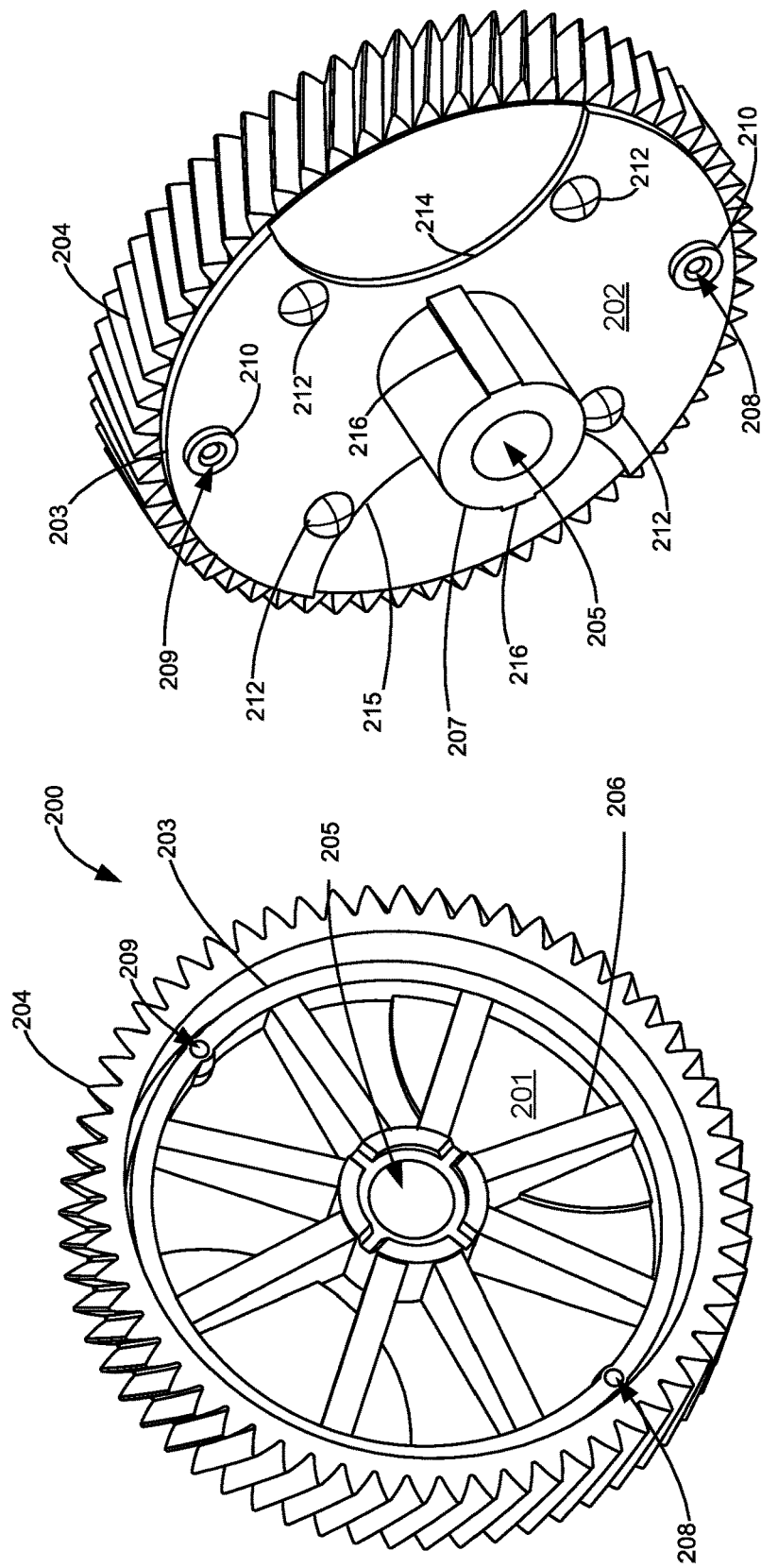
FIGS. 7-8 illustrate the input plate of the Oldham coupler assembly where

Referring to FIGS. 6-8, input plate 200 has outer and inner faces 201, 202 and outer edge 203. A plurality of gear teeth 204 may be provided around the outer edge 203 of input plate 200 and may be integrally molded therein. Center opening 205 receives stud 57. An e-clip or other fastener may be used to secure input plate 200 to stud 57. One or more spokes 206 may be molded on outer face 201 to further stiffen input plate 200. A post 207 having center opening 205 therethrough is provided on the inner face 202 of input plate 200. Post 207 provides additional bearing surface with stud 57 without further increasing the overall width of Oldham coupler assembly 100. A pair of opposed holes 208, 209 are provided through input plate 200, are positioned near the outer edge 203, and are used with fasteners 701, 702 to attach wheels 601, 602 to input plate 200. On inner face 202, bosses 210 may be provided around opposed holes 208, 209 and may have a chamfer to assist the entry of the fasteners 701, 702. One or more wear bumps 212 used to reduce the area of contact with drive plate 400 may also be provided on inner face 202. As shown four wear bumps 212 are distributed on inner face 202 forming the corners of a rectangle. Wear bumps 212 project about 1 mm above inner face 202. Also a pair of opposed scalloped channels 214, 215 may be provided in inner face 202. Channels 214, 215 serve as a travel surface for wheels 600, an in particular for wheels 603, 604, as drive plate 400 orbits within Oldham coupler assembly 100 during operation. A pair of axially opposed ribs 216 may also be provided on post 207 to further increase its torsional stiffness.

Figure 10:
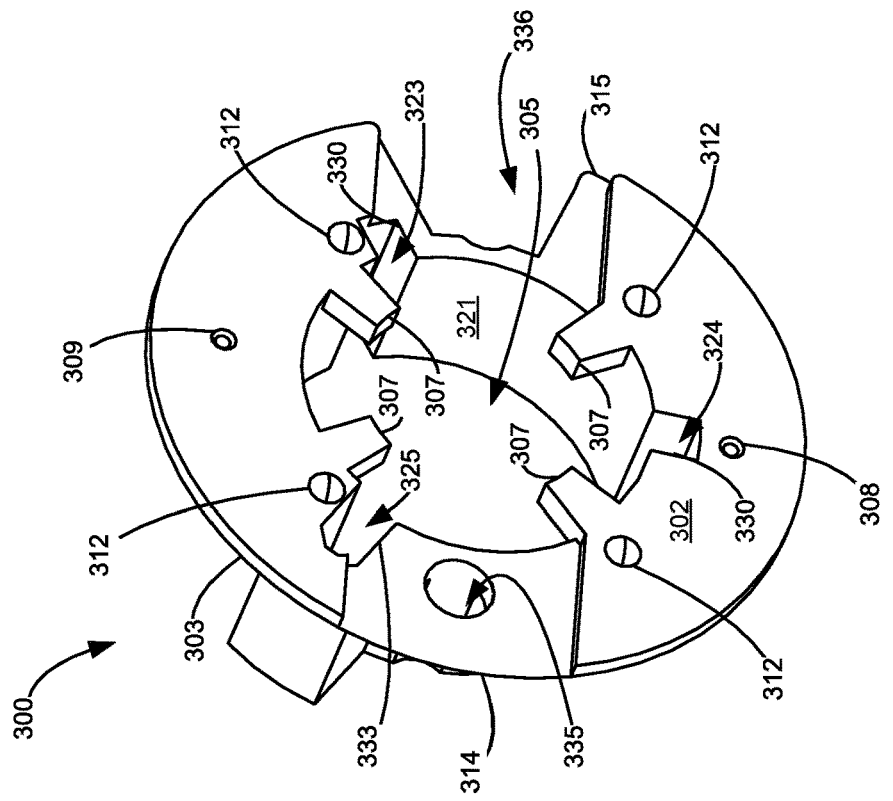
FIGS. 9-10 illustrate the output plate of the Oldham coupler assembly where
Figure 9:
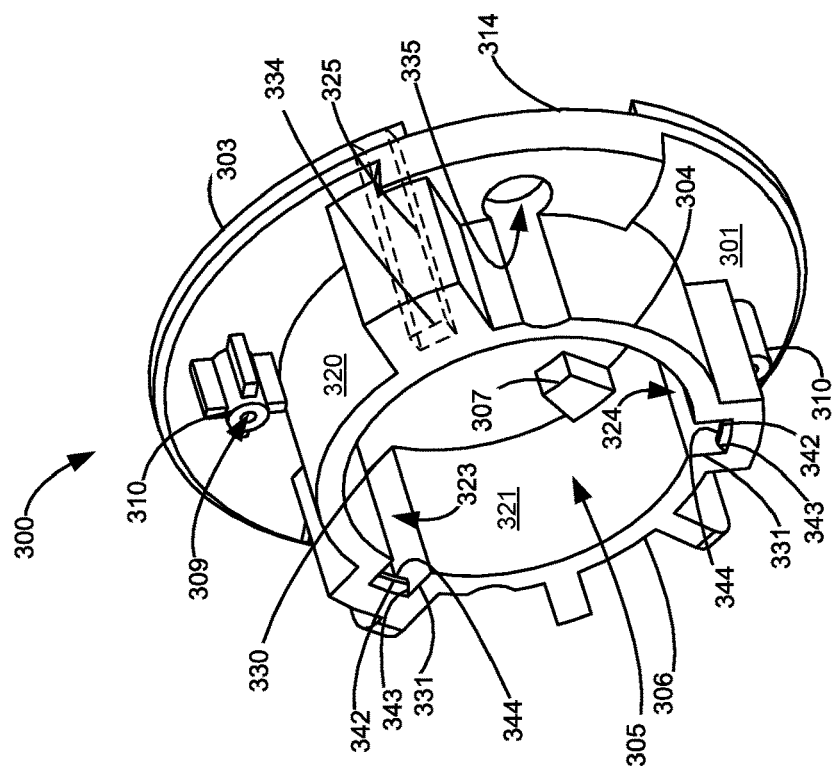

Referring to FIGS. 6 and 9-10, output plate 300 has outer and inner faces 301, 302 and outer edge 303. A collar 304 having a center opening 305 therethrough extends outwardly from outer face 301 in an axial direction. Center opening 305 is centered about output rotational axis Ao. Positioned about center opening 305 and adjacent inner face 302 are a plurality of spaced, inwardly directed radial fingers 307. Four fingers 307 are shown. A pair of opposed holes 308, 309 for fasteners 703, 704, are provided through output plate 300, are positioned near the outer edge 303, and may have a chamfer to assist the entry of the fasteners 703, 704. Pair of opposed holes 308, 309 are positioned orthogonally to the pair of opposed holes 208, 209 in input plate 200 in the assembled Oldham coupler 100. On outer face 301, a boss 310 may be provided around each of holes 308, 309 to provide additional bearing surface for the fasteners 703, 704. One or more wear bumps 312, similar to wear bumps 212, may also be provided on inner face 302. Four wear bumps 312 are distributed on inner surface 302 in a similar pattern to wear bumps 212. Also, a pair of opposed channels 314, 315 may be provided in inner face 302. Channels 314, 315 serve as a travel surface for wheels 601, 602 as drive plate 400 orbits within Oldham coupler assembly 100. Channels 214, 215, 314, 315 also help decrease the width of Oldham coupler assembly 100.

Figure 18:
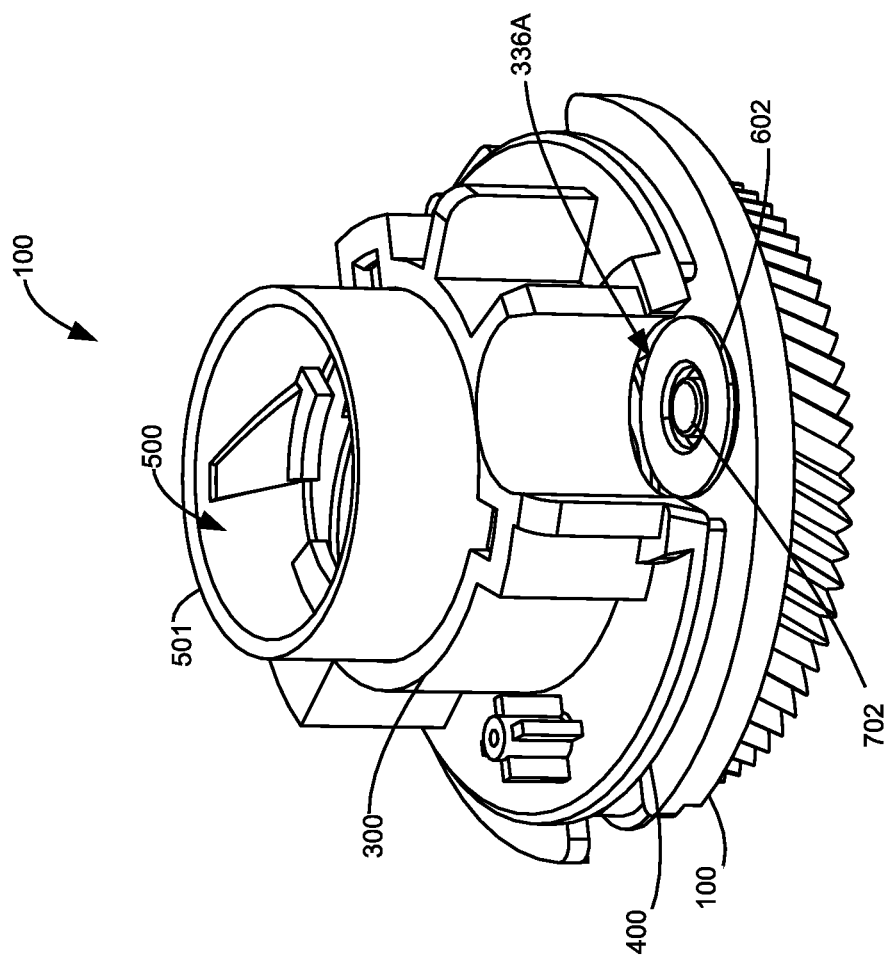
FIG. 18 illustrates an assembled Oldham coupler assembly having a circular notch in the output plate.

Collar 304 has outer and inner walls 320, 321, respectively. A plurality of axial channels 323, 324, 325 is angularly spaced about inner wall 321, about 120 degrees apart as illustrated. Channels 323, 324 are open-ended at each end, with each channel having a bottom end 330 at inner face 302 and a top end 331 adjacent a top end 306 of collar 304. The top ends 331 of channels 323, 324 each have one-way catches 342 that project into these channels. As shown in FIG. 9, top surfaces 343 of catches 342 are downwardly angled at approximately 65 degrees. Bottom surfaces 344 of catches 342 are flat so that in profile catches 342 are wedge-shaped. Channel 325 has an open bottom end 333 at inner face 302 and a closed top end 334 adjacent top end 306 of collar 304. As shown channel 325 has a greater depth than channels 323, 324 and is shorter in axial length. Channel 325 serves as a keyway during assembly of spline assembly 500 to output plate 300. As better seen in FIG. 13, the closed radial end 326 of channel 325 is shaped to conform to the end of retention lug 525 on collar 501 (see FIG. 13). Center opening 305 receives spline assembly 500 which is retained in output plate 300. A chamfer may be provided about center opening 305 at top end 306 of collar 304. Opening 335 in output plate 300 positioned in channel 314 and notch 336 in channel 315 provide access for attaching wheels 601, 602, to input plate 200 using fasteners 701, 702, respectively. Notch 336 is generally trapezoidal in shape and is sized to allow the insertion of one of wheels 601, 602, wheel 602 is shown in notch 336, into close-ended center slot 440 of drive plate 400 (see also FIG. 17). As shown in FIG. 13, open end 337 of notch 336 is greater than the diameter of the flanges found on wheel 602 allowing wheel 602 to slip into or be snapped into center slot 440. Open and closed ends 337, 338 of notch 336 have circumferential lengths of about 12 mm and about 6 mm, respectively. When output plate 300 is assembled with drive plate 400, notch 336 would be approximately centered about center slot 440. Notch 336 may have other shapes such as rectangular or circular and the chosen shape is a matter of design choice. Illustrated in FIG. 18 is a circular notch 336A in output plate 300. Wheel 602 is dropped into close-ended center slot 440 of drive plate 400 through circular notch 336A. Circular notch 336A has a diameter slightly larger than that of wheel 602.

Referring to FIGS. 6 and 14-15, drive plate 400 is generally circular in shape having an inner face 401, an outer face 402, and an outer edge 403. A pair of opposed open ended slots 420, 421 is centered about centerline C1, shown as a vertical centerline C1, while a closed-end center slot 440 is centered about centerline C2, shown as a horizontal centerline C2 that is orthogonal to centerline C1. A plurality of ribs 405 are provided on inner surface 401 for stiffening drive plate 400. Ribs 405 are shown adjacent outer edge 403 and along the sides of center slot 440. Ribs 405 also extend from the sides of center slot 440 toward the open ends of opposed slots 420, 421 forming a generally H-shaped pattern. Provided along the sides of center slot 440 approximately midway between the closed ends of center slot 440 are two opposed rib channels 441, 442. A pair of short stiffening ribs 406 is provided on outer surface 402. Rib channels 441, 442, receive the opposed ribs 216 on post 207 of input plate 200 when Oldham coupler assembly 100 is assembled. Ribs 405, 406 increase the stiffness of drive plate 400 and their shape and placement is a matter of design choice.

Each of slots 420, 421 is substantially identical, has a closed inner end 425 adjacent to center slot 440, an open outer end 426 at outer edge 403 and is generally U-shaped. Each of slots 420, 421 has a width W1 and a length L1. Slots 420, 421, are also referred to as open ended slots 420, 421. Center slot 440 has opposed closed ends 441, 442 adjacent to outer edge 403 and has a generally flat ellipsoidal shape. Center slot 440 is also referred to as close-ended center slot 440. Center slot 440 has a length L2 that is slightly shorter than the diameter D1 of drive plate 400 and a width W2. Slots 420, 421 provide tracks in which the wheels 604, 603, respectively, travel while center slot 440 provides a track in which wheels 601, 602 travel. The width W1 of slots 420, 421 and width W2 of center slot 440 is a matter of design choice. As shown widths W1 and W2 are substantially the same magnitude allowing the wheels 601-604 to be the same size. It is desirable to have the largest slot width possible while still maintaining the needed stiffness in drive plate 400. The larger the width of the slots, the larger the diameter of the cores 610 of wheels 600 can be to increase wheel to axle ratio. This helps to ensure that wheels 600 rotate rather than slide in their respective slots reducing uneven wear.

Referring to FIGS. 6 and 11-13, spline assembly 500 comprises a sleeve 501, and a biasing member 550. Spline assembly 500 may also be referred to as retraction spline assembly 500 as sleeve 501 may slide into opening 305 of collar 304 during insertion of the corresponding imaging unit 60. Sleeve 501 has an outer wall 502, an inner wall 503 with a central opening 504 therethrough, a bottom edge 505, and a top edge 506. A plurality of notches 507 may also be provided in bottom edge 505. The plurality of notches 507 are shown as being spaced about the circumference of sleeve 501 with four notches 507 being shown. When sleeve 501 is installed in output plate 300, notches 507 align with respective ones of the plurality of fingers 307 on output plate 300, allowing for increased axial travel of sleeve 501 within collar 304.

A plurality of retention lugs 523, 524, 525 extend radially outwardly from the outer wall 502 near a bottom edge 505 of sleeve 501 while a plurality of drive lugs 530, 531, 532 extend radially inwardly from the inner wall 503. Three of each type of lug is shown angularly placed about the circumference of sleeve 501. The plurality of retention lugs 523, 524, 525 are angularly spaced to align with the plurality of axial channels 323, 324, 325, respectively, in collar 304. The plurality of drive lugs 530, 531, 532 are angularly spaced to engage with respective ones of the plurality of drive dogs 62 on drive member 61.

Retention lugs 523, 524 are substantially identical and each has an angled surface 526 at their outer end. The angled surface 526 substantially matches the angled surface 343 of one way catches 342 found in channels 323, 324 helping the retention lugs 523, 524 to be more easily inserted into collar 304. As shown the angle is approximately sixty-five degrees. Retention lug 525 has a longer radial length than retention lugs 523, 524, has an angled or pointed distal end, and serves as a key when inserted into channel 325 during assembly of spline assembly 500 to output plate 300.

As shown in FIGS. 11-13, each of drive lugs 530-532 has a top or outer end 535, a bottom or inner end 536 interconnected by an engagement portion 537 and an optional angled ramp portion 538 forming an irregular trapezoidal shape. As shown, engagement portion 537 is at a small acute angle with respect to top end 535 while ramp portion 538 is at a generally obtuse angle with respect to top end 535 so that each of drive lugs 530-532 is wider along its bottom end 536 than at its top end 535. Biasing member 550 may have one end thereof seated against either bottom ends 536 of drive lugs 530-532 or, if provided, against a spring seat 539 formed by a plurality of arcuate seating segments 540-542 with the other end seated against fingers 307. As shown, seating segments 540-542 radially project into center opening 504 and are positioned on inner wall 503 adjacent bottom ends 536 of drive lugs 530-532, respectively. Seating segments 540-542 may have substantially the same circumferential lengths as shown with seating segments 540, 541 or may be of different lengths as shown by seating segments 540 and 542.

The engagement portions 537 of drive lugs 530-532 engage with a corresponding engagement portion 64 on each of the plurality of drive dogs 62 (see FIG. 4) when sleeve 501 is rotated in the direction indicated by the arrow in FIG. 11 (counter-clockwise as shown). Should the rotational direction of sleeve 501 be reversed, surfaces 65 on the drive dogs 62 (see FIG. 4) will travel up the ramp portions 538 of the following drive lugs. When engagement portions 64 of drive dogs 62 clear ramp portions 538 of the following drive lugs, the engagement portions 64 will engage with the engagement portions 537 of those following drive lugs. This is done to limit the amount of reverse rotation that may be applied to drive members 61 and the components within imaging units 60 driven by drive members 61.

The number of drive dogs 62, retainer lugs 523-525, drive lugs 530-532, seating segments 540-542 is a matter of design choice and should not be considered as a limitation of the disclosed Oldham coupler assembly 100. Depending on size as few as one and more than three of these features may be provided. Further, the number of retainer lugs 523-525 does not need to match the number of drive lugs 530-532.

Sleeve 501 is sized to be slidably received into center opening 305 and snapped into place. The bottom end 505 of sleeve 501 is inserted into top end 306 of collar 304. Retention lug 525 is inserted into channel 325 and sleeve 501 is pinched so that retention lugs 523, 524 align with channels 323, 324, respectively. Retention lugs 523, 524 are snapped into place sliding over one-way catches 342 in channel 323, 324, respectively. The one-way catches 342 help prevent sleeve 501 from exiting collar 304 due to the biasing force provided by biasing member 550. The top edge 506 of sleeve 501 axially extends beyond the top end 306 of collar 304 due to the biasing force applied by biasing member 550. Biasing member 550 is inserted into collar 304 prior to sleeve 501 being installed. Biasing member 550 in one form may be a coil spring 550. Biasing member 550 is compressed between the plurality of seating segments 540-542 in sleeve 501 and the plurality of fingers 307 of output plate 300. Coil spring 550 biases sleeve 501 in collar 304 axially outwardly from outer face 301. It should also be noted that center opening 504, the width W2 of center channel 440 and the inner diameter of coil spring 550 are sized to allow for the passage of post 207 therethrough to further reduce the overall width of the assembled Oldham coupler assembly 100.

Referring again to FIGS. 6 and 14-15, wheels 600 are comprised of two pairs—wheels 601, 602 and wheels 603, 604. Wheels 601, 602 are used in the close-ended center slot 440. Wheels 604, 603 are used with opposed open-ended slots 420, 421, respectively. Wheels 601, 602 have a diameter D2 while wheels 603, 604 have a diameter D3. Diameter D2 and channel width W2 of center channel 440 are substantially the same while diameter D3 and channel width W1 of opposed channels 420, 421 are also substantially the same. As is known in the art, diameters D2, D3 are slightly smaller than channel widths W1, W2, respectively. In one example embodiment, diameters D2, D3 and channel widths W1, W2 are substantially equal. Wheel pairs 601, 602 and 603, 604 are also substantially the same in construction. Because of this in FIG. 6 only the elements of wheel 601 are labelled with the reference numbers discussed. Each wheel 601-604 has a core 610 having an opening 611 therethrough and a flange 612. The cores 610 of wheels 601-604 are sized to be rotated by rolling and not sliding when wheels 601-604 are in their respective slots as drive plate 400 orbits within Oldham coupler assembly 100. As shown in FIGS. 14-15, flange 612 has a diameter that is greater than the slot widths W1, W2. In prior Oldham coupler designs one pair of wheels had a smaller wheel diameter and lower wheel diameter to axle ratio than the other pair of wheels due to space constraints. A larger wheel diameter to axle ratio helps to ensure that the wheel rotates and rolls in the slot rather than slides. With the disclosed design, both sets of wheels have substantially the same wheel diameter to axle ratio allowing both sets of wheels to wear more evenly. The flanges 612 of wheel pair 601, 602 ride in the pair of opposed channels 314, 315 and those of wheel pair 603, 604 ride in the pair of opposed scalloped channels 215, 214. The channels in input plate 200 and output plate 300 help to reduce the width of the assembled Oldham coupler assembly 100.

Fasteners 700 are used to assemble input and output plates 200, 300, drive plate 400, spline assembly 500 and wheels 600 together to form Oldham coupler assembly 100. Fasteners 701, 702 attach wheels 601, 602, respectively to input plate 200 and fasteners 703, 704, attach wheels 603, 604, respectively to output plate 300. Fasteners 701-704 are, in one example form, press pins 701-704 made of metal. Alternatively, fasteners 701-704 may be screw-type fasteners such as screw 701A. When fastener pair 701-704 are press pins, each press pin has a head 710 and a shaft 711 having three shaft portions 711-1-711-3 of decreasing diameter starting at the head 710. Because the same type of pin is used for all of the fasteners 701-704, only fastener 701 is labeled for these features in FIG. 6. Head 710 has a diameter that is greater than opening 611 in core 610. Head 710 may be counter sunk in wheels 601-604 to help decrease the overall assembly width of Oldham coupler assembly 100. Shaft portion 711-1 may be about 1.5 mm in diameter and provides a bearing surface (axle) for wheels 601-604 as it passes through corresponding openings 611 in core 610. Openings 611 have a diameter that is slightly larger than that of shaft portion 711-1. Shaft portion 711-3 has a diameter of about 0.85 mm and is used as a guide or pilot for the press pin as it is inserted through openings 611 and the respective hole in the pairs of opposed holes 208, 209, and 308, 309, as the case may be. Shaft portion 711-2 has a diameter of about 1.0 mm and is press fit into the corresponding hole in the pairs of opposed holes 208, 209 and 308, 309 as the case may be, and each may have a diameter of about 0.85 mm. The above dimensions are for purposes of illustration not limitation and are a matter of design choice.

FIGS. 16-17 illustrate the assembled Oldham coupler assembly 100. When assembled, spline assembly 500 is slidably engaged inside collar 304 of output plate 300 and biased by biasing member 550 that is positioned between sleeve 501 and output plate 300. Drive plate 400 is attached to both input plate 200 and output plate 300 via wheel pairs 601, 602 and 603, 604. As better seen in FIGS. 14-15, flanges 612 of wheel 601, 602 rest against outer face 402 while flanges 612 of wheels 603,604 rest against inner face 401 of drive plate 400. Fasteners 701, 702 secure wheels 601, 602 to the inner face 202 of input plate 200. Fasteners 703, 704 secure wheels 603, 604 to the inner face 302 of output plate 300. Drive plate 400 is held by flanges 612 on wheel pairs 601, 602 and 603, 604 and is moveably coupled to both input plate 200 and output plate 300. For the orientation shown in FIG. 6, drive plate 400 is able to move vertically with respect to output plate 300 and horizontally with respect to input plate 200. In one example embodiment, drive plate 400 is able to move approximately 2.0 mm in each direction.

The stiffness of Oldham coupler assembly 100 is increased by combining the Oldham coupler input plate with the gear that drives it. Moving the retraction spline assembly 500 to the output side of the Oldham coupler allows for a larger diameter sleeve 501, thereby increasing its torsional stiffness. Sleeve 501 may have a larger diameter, for example about 19 mm, as compared to prior designs having sleeves with a diameter of about 10 mm. In those prior art designs, the sleeve therein would have to pass through the center opening of the drive plate and because of its smaller diameter its torsional stiffness is reduced. The increased torsional stiffness of sleeve 501 reduces jitter when the imaging units 60 are driven at higher process speeds providing improved print quality. The stiffness of provided by output plate 300 and spline assembly 500 is in the range of about 17 to about 30 in-oz/degree. By combining the drive gear for the Oldham coupler assembly 100 with the input plate, as shown with input plate 200, the overall assembled Oldham coupler assembly 100 is more compact.

Input plate 200, output plate 300, and sleeve 501 may be made of a first material such as plastic allowing these plates 200, 300 and their respective features previously described to be molded. Example plastics that may be used are, but not limited to, polyoxymethylene (POM), polypropylene, polyethylene, and acrylonitrile butadiene styrene (ABS), an acetal copolymer, a nylon, an acetal copolymer with glass and a nylon with glass. One example acetal copolymer is DURACON® M90-44 made by Polyplastics Co. of JR Shinagawa East Bldg., 18-1, Konan 2-chome, Minato-ku, Tokyo 108-8280, Japan. Another example acetal copolymer that may be used for sleeve 501 is DURACON® NW-02 which is an acetal copolymer with lubrication added. A further example acetal copolymer that may be used for input plate 200 is Asahi TENAC® HC750 acetal copolymer resin made by Asahi Kasei Corporation, 1-105 Kanda Jinbocho, Chiyoda-ku, Tokyo 101-8101, Japan.

Drive plate 400 and wheels 600 may be made of a second material, also plastic. Example plastics that may be used are, but not limited to, polyoxymethylene (POM), polypropylene, polyethylene, and acrylonitrile butadiene styrene (ABS), an acetal copolymer, a nylon, an acetal copolymer with glass and a nylon with glass. One example acetal copolymer is DURACON® M90-44. By having drive plate 400 and wheels 600 made of the same material, the coefficient of friction between wheels 600 and drive plate 400 is greater than had drive plate 400 and wheels 600 been made of dissimilar materials. Contrary to accepted engineering practice, here the greater coefficient of friction is advantageous. Wheel pairs 601, 602, and 603, 604 will rotate rather than slide within their respective slots in drive plate 400. Sliding causes the cores 610 and respective slots 420, 421, 440 in drive plate 400 to wear unevenly reducing the operational life of the wheels 601-604 and drive plate 400 as compared to wheels that are able to rotate in the drive plate. Use of plastic for all of the pieces expect for the biasing member 550 reduces the weight and cost of Oldham coupler assembly 100.

In one example form, input plate 200 may have a thickness of about 5 mm and an outer diameter of about 32 mm with post 207 having an axial length of about 7 mm and a diameter of about 8 mm.

In one example form, output plate 300 may have a thickness of about 10 mm and an outer diameter of about 36 mm. Center opening 305 may have a diameter of about 19 mm. Collar 304 may have an axial length of about 8 mm and an outer diameter of about 22 mm. Channels 323, 324 may have a width of about 3 mm and a depth of about 2.5 mm while channel 325 may have an axial length of about 8 mm, a width of about 3 mm and a depth of about 5 mm. Fingers 307 may project from inner wall 321 about 3 mm and have a width of about 3 mm and a thickness of about 3 mm.

In one example form, drive plate 400 may have a thickness of about 2 mm and an outer diameter of about 40 mm with center slot 440 having a width W2 of about 8 mm and a length L2 of about 23 mm and opposed slots 420, 421 may each have a width W1 of about 8 mm and a length L1 of about 11 mm.

In one example form, sleeve 501 may an axial length of about 9 mm and inner and outer diameters of about 17 mm, 19 mm, respectively. Notches 507 may have a width of about 4 mm and a height of about 1 mm. Retention lugs 523, 524 may have a radial length of about 2.5 mm, a width of about 2.5 mm and a height of about 1.5 mm while retention lug 525 may have a radial length of about 4 mm, a width of about 2.5 mm and a height of about 1.5 mm. Drive lugs 530-532 may project about 1 mm from inner wall 503 with top ends 535 having a length of about 2 mm, bottom ends 536 having a length of about 6 mm, engagement portions 537 having a length of about 4 mm, and ramp portions 538 having a length of about 5 mm. Seating segments 540, 541 may project about 2 mm from inner wall 503 and have a circumferential length of about 6 mm and an axial height of about 1 mm. Seating segment 542 may project about 2 mm from inner wall 503 and have a circumferential length of about 12 mm and an axial height of about 1 mm.

Example sizing for wheels 601-604 is about 9.3 mm for flange 612, about 7.9 mm for core 610 and about 1.56 mm for opening 611. Core 610 may have a length of about 2.2 mm and flange 612 a thickness of about 0.5 mm.

The structural elements employed in the present invention of metal and plastic combination control the location and firmly secure the components together in a manner that will transmit high torque loads required to drive the imaging unit 60. The presently disclosed lower cost, lower weight composite Oldham coupler demonstrates a substantial reduction in jitter to be in the range of about 0.5 mm to about 2 mm on a media sheet.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An Oldham coupler assembly for transferring rotary power between two shafts, comprising:
    an input plate and an output plate made of a first material, the input plate having gear teeth about an outer circumference thereof and the output plate having a spline assembly retained therein and centered about an axis of rotation of the output plate, the spline assembly biased outwardly from an outer face of the output plate and being axially slidable;
    a drive plate made of a second material and positioned between and mechanically coupled to the input plate and the output plate, the drive plate having a pair of opposed open-ended slots having a first centerline passing through a center of the drive plate and an elongated close-ended center slot having a second centerline passing through the center of the drive plate positioned orthogonal to the first centerline;
    a first pair of wheels rotatably fastened to an inner face of the input plate; and,
    a second pair of wheels rotatably fastened to an inner face of the output plate, each wheel of the first pair of wheels rotatably engaging with a respective one of the pair of open-ended opposed slots and the second pair of wheels rotatably engaging with the center slot, the first and second pair of wheels being made of the second material and moveably coupling the drive plate to the input and output plates, respectively.

2. The Oldham coupler assembly of claim 1, wherein the first material is a first type of plastic and the second material is a second type of plastic.

3. The Oldham coupler assembly of claim 1, wherein the first material and the second material are a same type plastic.

4. The Oldham coupler assembly of claim 2, wherein the first material comprises a material selected from a group of materials consisting of a polyoxymethylene (POM), a polypropylene, a polyethylene, an acrylonitrile butadiene styrene (ABS), an acetal copolymer, a nylon, an acetal copolymer with glass and a nylon with glass.

5. The Oldham coupler assembly of claim 2, wherein the second material comprises a material selected from a group of materials consisting of a polyoxymethylene (POM), a polypropylene, a polyethylene, an acrylonitrile butadiene styrene (ABS), an acetal copolymer, a nylon, an acetal copolymer with glass and a nylon with glass.

6. The Oldham coupler assembly of claim 1, wherein the first pair of wheels has a diameter D1, the second pair of wheels has a diameter D2, the pair of opposed open-ended slots have a width W1 and the central slot has a width of W2, wherein the diameter D1 is equal to or less than the width W1 and the diameter D2 is equal to or less than the width W2, and further wherein the width W1 and the width W2 are substantially equal.

7. The Oldham coupler assembly of claim 6, wherein the widths W1 and W2 are each about 8 to about 8.1 mm and the diameters D1 and D2 are each equal to about 7.9 to about 8 mm.

8. The Oldham coupler assembly of claim 1, wherein:
the output plate further comprises:
    a collar axially extending from the outer face of the output plate, the output plate and collar having a center opening extending from the inner face of the output plate through the collar;
    a plurality of radially spaced fingers projecting into the center opening; and,
    an inner wall of the collar having a plurality of axial channels wherein a first channel of the plurality of axial channels has an open end at the inner face of the output plate and a closed end adjacent a top end of the collar with the remaining channels of the plurality of axial channels having an open top at the top end of the collar and an open bottom at the inner face of the output plate, the first channel having a depth that is greater than the remaining channels;
and,
the spline assembly comprises:
    a sleeve sized to be slidably received into the collar via the top end of the collar, the sleeve having a plurality of drive lugs radially inwardly extending from an inner wall of the sleeve and a plurality of retention lugs radially outwardly extending from an outer wall of the sleeve;
    a first retention lug of the plurality of retention lugs having a length greater than a length of the remaining plurality of retention lugs, the first retention lug and the remaining plurality of retention lugs sized to be slidably received into the first channel of the plurality of axial channels and the remaining channels of the plurality of axial channels, respectively; and,
    a biasing member seated between the sleeve and the plurality of fingers for biasing the sleeve toward the top of the collar.

9. The Oldham coupler assembly of claim 8, wherein the sleeve further comprises a seating ring radially extending from the inner wall of the sleeve and positioned adjacent a bottom of the plurality of drive lugs, the seating ring consisting of a plurality of radially spaced seating segments.

10. The Oldham coupler assembly of claim 9, wherein the biasing member is seated between the plurality of fingers and the seating ring.

11. The Oldham coupler assembly of claim 10, wherein a one way catch projects into each of the remaining channels of the plurality channels at the respective open top at the top end of the collar.

12. The Oldham coupler assembly of claim 1, wherein the drive plate, the sleeve, and the biasing member each have a center opening therethrough and the input plate further comprises a post positioned about an axis of rotation of the input plate and axially extending from the inner face thereof through the corresponding central openings of the drive plate and the biasing member and into the sleeve.

13. The Oldham coupler assembly of claim 1, wherein the inner faces of the input plate and the output plate each has a plurality of spaced wear bumps.

14. The Oldham coupler assembly of claim 1, wherein each wheel in the first and second pairs of wheels has a flange having a diameter greater than a width of the respective slot in the drive plate in which the wheel is positioned and the inner face of the input plate has a pair of opposed scalloped channels aligned with the second pair of wheels and the inner face of the output plate has a pair of opposed channels aligned with the first pair of wheels, the pairs of opposed channels in the input and output plate receiving the flanges of the each of the second and first pairs of wheels, respectively.

15. The Oldham coupler assembly of claim 1, wherein the output plate has an open-ended notch therein sized to allow one wheel of the second pair of wheels to be inserted therethough and into the center slot during assembly of the Oldham coupler assembly.

16. The Oldham coupler assembly of claim 15, wherein the open-ended notch has a generally trapezoidal shape with an open end of the notch having a length greater than a length of the closed end of the notch.

17. The Oldham coupler assembly of claim 15, wherein the open-ended notch has a circular shape.

18. An Oldham coupler assembly for transferring rotary power between two shafts, comprising:
    an input plate and an output plate made of a plastic material, the input plate having gear teeth integrally molded about an outer circumference thereof;
    a drive plate made of the plastic material and positioned in between and slidably coupled to the input plate and the output plate, the drive plate having a pair of opposed open-ended slots having a first centerline passing through a center of the drive plate and an elongated close-ended center slot having a second centerline passing through the center of the drive plate positioned orthogonal to the first centerline;
    a first pair of wheels rotatably fastened to an inner surface of the input plate; and,
    a second pair of wheels rotatably fastened to an inner face of the output plate, the first pair of wheels rotatably engaging with respective opposed slots in the pair of open-ended opposed slots and the second pair of wheels rotatably engaging the center slot, the first and second pair of wheels being made of the plastic material, the first and second pairs of wheels moveably coupling the drive plate to the input and output plates, respectively.

19. The Oldham coupler assembly of claim 18, wherein the plastic material is selected from a group of materials consisting of a polyoxymethylene (POM), a polypropylene, a polyethylene, an acrylonitrile butadiene styrene (ABS), an acetal copolymer, a nylon, an acetal copolymer with glass and a nylon with glass.

20. The Oldham coupler assembly of claim 19, wherein:
the output plate further comprises:
    a collar axially extending from an outer face of the output plate, the output plate and collar having a center opening extending from an inner face of the output plate through the collar;
    a plurality of radially spaced fingers projecting into the center opening; and,
    an inner wall of the collar having a plurality of axial channels wherein a first channel of the plurality of axial channels has an open end at the inner face of the output plate and a closed end adjacent a top end of the collar with the remaining channels of the plurality of axial channels having an open top at the top end of the collar and an open bottom at the inner face of the output plate, the first channel having a depth that is greater than the remaining channels and further wherein a one way catch projects into each of the remaining channels at the respective open tops at the top end of the collar;

and,
the spline assembly comprises:
- a sleeve sized to be slidably received into the collar via the top end of the collar, the sleeve having plurality of drive lugs radially inwardly extending from an inner wall of the sleeve and a plurality of retention lugs radially outwardly extending from an outer wall of the sleeve;
- a first retention lug of the plurality of retention lugs having a length greater than a length of the remaining plurality of retention lugs, the first retention lug and the remaining plurality of retention lugs sized to be slidably received into the first channel of the plurality of axial channels and the remaining channels of the plurality of axial channels, respectively; and,
- a biasing member seated between the sleeve and plurality of fingers for biasing the sleeve toward the top of the collar.

21. The Oldham coupler assembly of claim 19, wherein the drive plate and biasing member each have a center opening therethrough and the input plate further comprises a post positioned about an axis of rotation of the input plate and axially extending from the inner face thereof through corresponding openings of the drive plate and biasing member and into the sleeve.

22. The Oldham coupler assembly of claim 18, wherein the inner faces of the input plate and the output plate each have a plurality of spaced wear bumps.

23. The Oldham coupler assembly of claim 19, wherein the first pair of wheels and the second pair of wheels have substantially the same diameter D1 and the pair of opposed open ended slots and the center slot have a width W1 wherein the diameter D1 is equal to or less than the width W1.

24. The Oldham coupler assembly of claim 23, wherein the width W1 is approximately 8 mm and the diameter D1 is slightly less than or equal the width W1.

25. The Oldham coupler assembly of claim 18, wherein the output plate has an open-ended notch therein sized to allow one wheel of the second pair of wheels to be inserted therethough and into the center slot during assembly of the Oldham coupler assembly.

26. The Oldham coupler assembly of claim 25, wherein the open-ended notch has a generally trapezoidal shape with an open end of the notch having a length greater than a length of the closed end of the notch.

27. The Oldham coupler assembly of claim 25, wherein the open-ended notch has a circular shape.

* * * * *